(12) United States Patent
Oroskar et al.

(10) Patent No.: US 9,794,943 B1
(45) Date of Patent: Oct. 17, 2017

(54) DYNAMIC SCHEDULING BASED ON CARRIER AGGREGATION CAPABILITIES

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 274 days.

(21) Appl. No.: 14/574,882

(22) Filed: Dec. 18, 2014

(51) Int. Cl.
*H04W 4/00* (2009.01)
*H04W 72/04* (2009.01)

(52) U.S. Cl.
CPC ................................ *H04W 72/048* (2013.01)

(58) Field of Classification Search
None
See application file for complete search history.

(56) References Cited

U.S. PATENT DOCUMENTS

| | | | | |
|---|---|---|---|---|
| 8,494,518 | B1* | 7/2013 | Shah | H04W 48/16 455/432.3 |
| 2001/0038630 | A1* | 11/2001 | Tong | H04B 7/2656 370/395.1 |
| 2003/0161328 | A1 | 8/2003 | Chase et al. | |
| 2008/0253319 | A1 | 10/2008 | Ji et al. | |
| 2012/0083309 | A1* | 4/2012 | Kwon | H04B 17/382 455/522 |
| 2012/0088455 | A1 | 4/2012 | Love et al. | |
| 2013/0083783 | A1 | 4/2013 | Gupta et al. | |
| 2013/0114517 | A1 | 5/2013 | Blankenship et al. | |
| 2013/0322370 | A1 | 12/2013 | Fong et al. | |
| 2014/0204871 | A1 | 7/2014 | Ode | |
| 2016/0204838 | A1 | 7/2016 | Park et al. | |

OTHER PUBLICATIONS

Ghaleb et al., "QoS-Aware Joint Uplink-Downlink Scheduling in FDD LTE-Advanced with Carrier Aggregation", IEEE, 2014, pp. 111-115.
U.S. Appl. No. 14/531,628, filed Nov. 3, 2014.

* cited by examiner

*Primary Examiner* — Zewdu A Beyen

(57) ABSTRACT

Disclosed herein are methods and systems that may help to dynamically schedule data transmissions in accordance with a fairness policy between different classes of a users. An example method may be implemented in an access network that is configured for carrier-aggregation service via a plurality of component carriers in a given coverage area, and involves: (i) determining a usage level in the given coverage area, and (ii) determining that the usage level in the given coverage area is greater than a threshold usage level and responsively: (a) determining relative carrier-aggregation capabilities between two or more classes of user equipment (UE) that have established data connections in the coverage area, and (b) adjusting a per-carrier scheduling ratio for the given coverage area based on the relative carrier-aggregation capabilities between the two or more UE classes.

20 Claims, 5 Drawing Sheets

DYNAMIC SCHEDULING BASED ON CARRIER AGGREGATION CAPABILITIES

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining a respective downlink frequency range or "downlink channel" for carrying communications from the base station to UEs and a respective uplink frequency range or "uplink channel" for carrying communications from UEs to the base station. Further, both the downlink channel and uplink channel of each carrier may be divided into sub-channels for carrying particular communications, such as one or more control channels for carrying control signaling and one or more traffic channels for carrying application-layer data and other traffic.

In general, when a UE is positioned within coverage of a base station, the base station may serve the UE on a particular carrier and may allocate resources on that carrier for use to carry communications to and from the UE.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are divided over the bandwidth of the carrier into sub-carriers that are grouped within each slot into resource blocks. When a UE is positioned within coverage of a base station in such a system, the UE may register or "attach" with the base station, and the base station may then schedule particular downlink and uplink resource blocks on the air interface to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

With such an arrangement, the bandwidth of the carrier on which the base station serves a UE may define an effective limit on the rate of data communication between the base station and the UE, as the bandwidth would define only a limited number of resource blocks per slot, with data rate per resource block being further limited based on air interface conditions. By way of example, in accordance with the LTE standard, the uplink and downlink channels on each carrier may be 3 MHz, 5 MHz, 10 MHz, 15 MHz, or 20 MHz, each resource block spans 180 kHz, and each slot is 0.5 milliseconds long. Accounting for guard bands at the edges of each carrier, the maximum number of resource blocks per 0.5 millisecond slot is thus 15 in 3 MHz, 25 in 5 MHz, 50 in 10 MHz, 75 in 15 MHz, and 100 in 10 MHz. Consequently, an LTE base station (interchangeably referred to as a an "eNodeB" herein) that serves UEs on such a carrier would have only the specified number of resource blocks available to allocate for air interface communication per slot, with coding rate in each resource block being further limited based on air interface conditions.

One way to help overcome this per-carrier data rate limitation is to have a base station serve a UE on multiple carriers at once, providing what is known as "carrier aggregation" service. With carrier-aggregation service, multiple carriers from either contiguous frequency bands or non-contiguous frequency bands are aggregated together as "component carriers" to increase the overall bandwidth available per slot by providing a greater number of resource blocks in which the eNodeB can schedule uplink and downlink communication. Further, where the concurrently-used component carriers are sufficiently distant from each other in the frequency spectrum, serving a UE concurrently on those component carriers may additionally create a frequency-diversity effect that could further improve data throughput.

OVERVIEW

In practice, an eNodeB operating under LTE may apply a scheduling process to assign slots for data communication to various UEs. As such, when an eNodeB is concurrently engaged in communications with multiple client devices (referred to as user equipment (UE) in the context of LTE), the eNodeB may, by default, output data at a ratio of 1:1 on each component carrier, so as to output data for one UE at the same rate as it outputs data for another UE in the same coverage area.

However, in some cases, it may be desirable to provide more favorable service to some users, and not to others. For example, a service provider may impose a relatively strict policy on a UE that is associated with a user-account of a heavy data user (e.g., one that engages in excessive data communication). In particular, the service provider, and may impose a different scheduling ratio, in order to output less units of data in a given timeframe to a UE of heavy data user, than are output in the given timeframe to UEs associated with other users (e.g., UEs associated with user accounts that do not have an abnormally high level of data usage). For instance, in order to promote a fair distribution of network resources, a service provider may implement a 2:1 scheduling ratio, such that an eNodeB transmits to a UE associated with normal data usage on two resource blocks of the traffic channel, for every one resource block that includes data to a UE associated with heavy data usage.

Under LTE, an eNode typically applies a scheduling ratio between different classes of UEs to the resource blocks of a specific carrier. In other words, the schedule may assign resource blocks on a carrier such that the scheduling ratio is maintained on that carrier.

When an eNodeB's scheduler applies a scheduling ratio to a specific carrier, the implementation of carrier aggregation may present an issue with respect to maintaining a desired transmission ratio between a heavy user's UE and a normal user's UE.

More specifically, when a given UE is served with carrier aggregation with N component carriers, the eNodeB will output N times as many units of data per unit time to the given UE, as the eNodeB outputs to a UE that is served without carrier aggregation, i.e., that is served with just one carrier. As a result, if a heavy user's UE is provided with carrier-aggregation service, while a normal data user's UE is not provided with carrier-aggregation service, the application of the scheduling ratio to each carrier may result in an aggregate scheduling that differs from the desired ratio, and thus lessens or defeats the desired policy of reducing the rate at which data is transmitted to the UE of a heavy data user.

For instance, if the eNodeB applies a 2:1 scheduling ratio as describe above, the eNodeB may output, on each carrier, one unit of data per unit time to a heavy user's UE. Thus, applying carrier aggregation with two carriers, for example, would result in the eNodeB outputting two units of data per unit time to the heavy user's UE (e.g., the aggregate of one data unit per unit time on each of the two carriers). At the same time, applying the 2:1 scheduling ratio, the eNodeB may output, on each carrier, two units of data per unit time to a normal user's UE. However, in a scenario where a normal user's UE is served without carrier aggregation, the eNodeB may only transmit to the normal user's UE on one carrier. Thus, due to the implementation of carrier aggregation, the normal user's UE and the heavy user's UE would both receive two units of data per unit time, resulting in an aggregate scheduling ratio of 2:2 (i.e., 1:1). Thus, applying carrier aggregation in this scenario would produce a result contrary to the desired policy of maintaining a 2:1 ratio between units of data sent to the normal user's UE per unit of time, and units of data sent to the heavy user's UE per unit of time.

Accordingly, exemplary embodiments may help to maintain a desired ratio between units of data sent to the normal user's UE per unit of time, and units of data sent to the heavy user's UE per unit of time, when carrier aggregation is implemented. More specifically, UEs may be associated with different priority levels (e.g., by assigning a lower priority to UEs of heavy data users). UEs may also be classified by their respective carrier aggregation capabilities; i.e., by whether or not the UE is configured for carrier aggregation, and thus would be provided with carrier-aggregation service. In this framework, an exemplary embodiment may be implemented to adjust the per-carrier scheduling ratio such that the actual aggregate scheduling ratio, across all carriers in a given coverage area, is equal to a target aggregate scheduling ratio. For instance, an exemplary eNodeB may be operable to detect the above situation where the normal user's UE is served without carrier aggregation and the heavy user's UE is served with carrier aggregation and two component carriers, and responsively change the per-carrier scheduling ratio to 4:1 instead of 2:1, so as to achieve an aggregate scheduling ratio of 4:2 (which is equal to the target scheduling ratio of 2:1).

In a further aspect, an eNodeB may only apply an exemplary method for dynamically adjusting the per-carrier scheduling ratio in a given coverage area, such as that described above, when the load in the given coverage area is high (e.g., above some threshold level). For example, the eNodeB could determine a measure of traffic level on the primary downlink component carrier, or on a total traffic level across one or more secondary component carriers (e.g., the component carriers that are utilized to provide carrier aggregation service). In either case, the eNodeB may only implement an exemplary method when the determined measure of traffic level is above a threshold level.

More generally, an exemplary method involves determining, by a radio access network (RAN) that is configured for carrier-aggregation service via a plurality of component carriers in a given coverage area, that a second UE is both (i) associated with a second user-equipment class from a plurality of user-equipment classes, and (ii) configured for carrier-aggregation service, wherein the second UE has established a data connection in the given coverage area. The method further involves determining, by the RAN, that a first UE that has also established a data connection in the given coverage area, is both (i) associated with a first user-equipment class from the plurality of user-equipment classes, and (ii) not configured for carrier-aggregation service. The method further involves, at least in part as a response to the determination that both the first UE and the second UE have established respective data connections in the given coverage area, the RAN: (a) determining, based at least in part on a target aggregate scheduling ratio across all the component carriers for the given coverage area, a per-carrier scheduling ratio between the first user-equipment class and the second user-equipment class, and (b) using the determined per-carrier scheduling ratio to schedule data communications via the plurality of component carriers.

In a further aspect, another exemplary method involves determining, by a radio access network (RAN) that is configured for carrier-aggregation service via a plurality of component carriers in a given coverage area, a usage level in the given coverage area, wherein a target aggregate scheduling ratio is defined for the coverage area, and wherein the target aggregate scheduling ratio indicates that a first number of data units that should be sent to a user equipment (UE) of a first user-equipment class for each data unit that is sent to a UE of a second user-equipment class. The method further involves the RAN determining that the usage level in the given coverage area is greater than a threshold usage level and responsively: (a) determining, by the RAN, that a first UE that has established a data connection in the given coverage area is both (i) associated with a first user-equipment class from the plurality of user-equipment classes, and (ii) not configured for carrier-aggregation service, (b) determining that a second UE that has established a data connection in the given coverage area is both (i) associated with a second user-equipment class, and (ii) configured for carrier-aggregation service, and (c) in response to the determining that both the first UE and the second UE have established respective data connections in the given coverage area, implementing a per-carrier scheduling ratio that indicates that a UE of the first user-equipment class should be sent a second number of data units for each data unit that is sent to a UE of the second user-equipment class, wherein the second number is greater than the first number.

In an additional aspect, another exemplary method involves a RAN, which is configured for carrier-aggregation service via a plurality of component carriers in a given coverage area: (a) determining a usage level in the given coverage area, and (b) determining that the usage level in the given coverage area is greater than a threshold usage level and responsively: (i) determining relative carrier-aggregation capabilities between two or more classes of user equipment (UE) that have established data connections in the coverage area, and (ii) adjusting a per-carrier scheduling ratio for the given coverage area based on the relative carrier-aggregation capabilities between the two or more UE classes.

In another aspect, an exemplary system includes at least one wireless communication interface operable to provide carrier-aggregation service via a plurality of component carriers in a given coverage area of a radio access network, and a controller. The controller is configured to determine that a usage level in the given coverage area is greater than a threshold usage level and responsively perform functions comprising: (i) determining relative carrier-aggregation capabilities between two or more classes of user equipment (UE) that have established data connections in the coverage area, (ii) adjusting a per-carrier scheduling ratio for the given coverage area based on the relative carrier-aggregation capabilities between the two or more UE classes that have established data connections in the coverage area, and (iii) scheduling communications for transmission over the plurality of component carriers, via the at least one wireless communication interface, in accordance with the adjusted per-carrier scheduling ratio.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

An exemplary embodiment of the present invention is described herein with reference to the drawings, in which.

DETAILED DESCRIPTION

Exemplary embodiments may be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
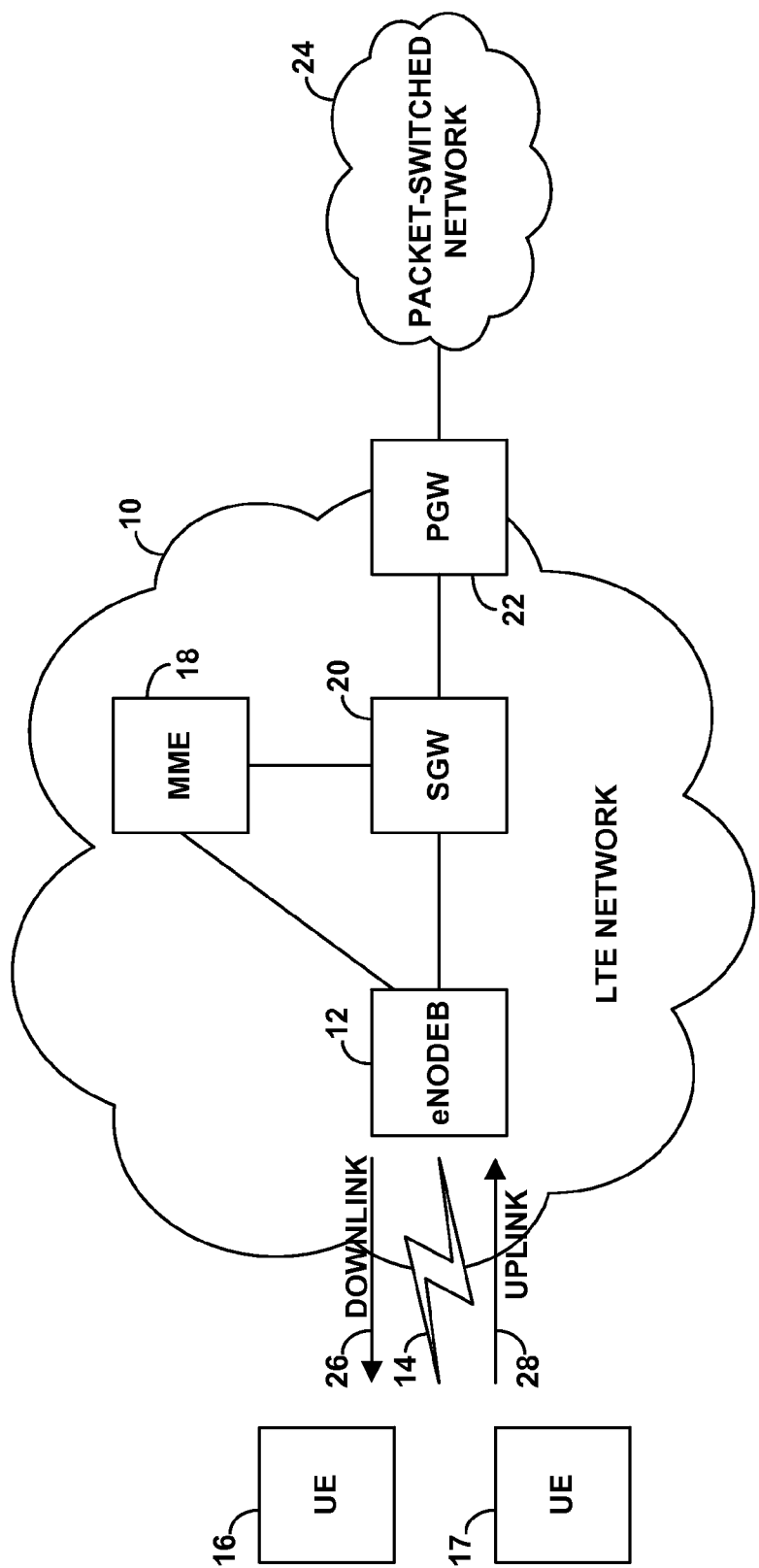
FIG. 1 is a simplified block diagram of a wireless communication system, according to an exemplary embodiment.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes an eNodeB 12, which has an antenna structure and associated equipment for providing an LTE coverage area 14 in which to serve UEs such as example UEs 16 and 17 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

As illustrated, the air interface of coverage area 14 defines a downlink direction 26 from the eNodeB to the UE and an uplink direction 28 from the UE to the eNodeB. Further, the eNodeB and UEs may be configured to support air interface communication on various carriers, each having a respective downlink channel spanning a particular frequency range and a different respective uplink channel spanning a different frequency range. Each such carrier and/or its particular downlink and uplink channels may be identified by one or more globally unique identifiers per industry standard, so that the eNodeB and a served UE can refer to particular carriers by those identifiers.

The LTE air interface may then define on the downlink various sub-channels, such as a physical downlink control channel (PDCCH) for carrying scheduling directives and other control signaling from the eNodeB to UEs and a physical downlink shared channel (PDSCH) for carrying scheduled downlink data communication, and the eNodeB may further broadcast on the downlink a reference signal that UEs can monitor to evaluate coverage quality. Likewise, the air interface may define on the uplink various sub-channels, such as a physical uplink control channel (PUCCH) for carrying scheduling requests and other control signaling from the UEs to the eNodeB and a physical uplink shared channel (PUSCH) for carrying scheduled uplink data communication, and UEs may further transmit uplink reference signals that the eNodeB can monitor to help evaluate uplink coverage quality.

With this arrangement, when UE 16 or UE 17 enters into coverage of eNodeB 12, the UE may engage in an attach process in order to register with the LTE network, and the UE may engage in signaling with the eNodeB to establish a radio-link layer connection through which the eNodeB may serve the UE. In particular, the UE may initially transmit to the eNodeB an attach request, which the eNodeB may pass along to the MME 18, triggering a process of authenticating the UE and establishment of one or more logical bearer connections for the UE between the eNodeB and the PGW 22. Further, the eNodeB may transmit to the UE a radio resource control (RRC) connection message that denotes a radio-link layer connection between the UE and the eNodeB.

Once the UE 16 has established an RRC connection, the eNodeB 12 may then serve the UE in an RRC-connected mode. In that mode, as the eNodeB 12 receives data for the UE 16 (e.g., from network 24 via PGW 22 and SGW 20), the eNodeB may transmit to the UE on the PDCCH a scheduling directive that instructs the UE to receive the data in particular resource blocks on the PDSCH, and the eNodeB may transmit the data to the UE in those resource blocks, and the UE may receive and process the data. Further, as the UE has data to transmit to the eNodeB (e.g., for transmission via SGW 20 and PGW 22 to network 24), the UE may transmit a scheduling request on the PUCCH to the eNodeB, the eNodeB may then transmit to the UE on the PDCCH a scheduling directive that directs the UE to transmit the data in particular resource blocks on the PUSCH, and the UE may transmit the data to the eNodeB in those resource blocks.

Further, after a period of no data scheduled for transmission between the UE and the eNodeB, the eNodeB may release the UE's radio-link layer connection, and the eNodeB may then serve the UE in an RRC-idle mode. In that mode, when the eNodeB then has data to send to the UE or the UE has data to send to the eNodeB, the UE and eNodeB may again engage in RRC signaling to re-establish a radio-link layer connection, thus transitioning the UE back to the RRC-connected mode.

Further, in an exemplary embodiment, eNodeBs may be configured for scheduling functions. For example, an eNodeB 12 may include a MAC scheduler, which allocates uplink and downlink radio resources amongst traffic flows with various UEs. In practice, scheduling may be implemented by allocating radio resource blocks to UEs that are engaged in communications in a given coverage area. Under LTE, the scheduler may allocate resource blocks to UEs once every subframe or Time Transmission Interval (TTI).

In an example scenario, UE 16 is configured for carrier-aggregation service. As such, eNodeB 12 may provide carrier-aggregation service to UE 16. In particular, through RRC signaling at the time of UE attachment or later, the eNodeB 12 may specify a set of carriers on which the eNodeB will be serving the UE 16 with carrier-aggregation service, with the set including at least a first component carrier F1 and a second component carrier F2. In practice, the first and second component carriers could be contiguous (with adjacent downlink channels and adjacent uplink channels) or non-contiguous (with non-adjacent, possibly distant downlink channels and non-adjacent, possibly distant uplink channels), and thus the carrier-aggregation service could be considered contiguous or non-contiguous. As such, the MAC scheduler of eNodeB 12 may assign resource blocks on each component carrier.

An eNodeB may learn of the carrier-aggregation capabilities of a UE in various ways. In an exemplary embodiment, UEs may indicate their respective carrier-aggregation capabilities when they register with the network. In particular, a UE may indicate its carrier-aggregation capability (e.g., whether or not it is capable of carrier aggregation, in a UE capability report message that is sent to the eNodeB during the registration process.

In a further aspect, LTE utilizes a number of traffic classes, which can have varying quality of service (QoS) attributes. In particular, there are nine standardized LTE QoS Class Identifiers (QCI), which may be referred to as QCI 1 to QCI 9, respectively. Each QCI may have different QoS attributes, such as bit rate, packet delay budget, packet loss rate, and a scheduling priority relative to other QCIs. Typically, QCI 1 to QCI 5 are defined so as to provide a guaranteed bit rate (GBR) to traffic flows assigned thereto, and thus may be referred to as GBR QCIs. QCI 6 to QCI 9 are typically defined so as to provide a variable bit rate for traffic flows assigned thereto, and thus may be referred to as non-GBR QCIs.

In an example embodiment, a service provider may have configured network 10 such that QCIs are assigned to UEs based on the data usage of respective user accounts associated with the UEs. In an exemplary embodiment, user accounts may be associated with one or two different QCIs, depending upon the respective data usage levels of the user accounts. For example, network 10 may associate QCI 8 with user accounts that utilize significantly more network resources than average (e.g., more than some threshold amount of data per month), and may associate QCI 9 with other user accounts (e.g., those that use less than some threshold amount of data per month). The user accounts that are associated with QCI 9 may be referred to as standard user accounts.

Accordingly, when a UE that is associated with a given user account engages in a communication via an LTE network, the uplink and/or downlink traffic flows may be assigned the QCI that is associated with the given user account. For example, in FIG. 1, UE 16 may be associated the user-account of a heavy user, while UE 17 may be associated the user-account of a standard user. As such, eNodeB 12 may assign QCI 8 to traffic flows to and from UE 16, and may assign QCI 9 to traffic flows to and from UE 17.

In practice, eNodeBs may schedule traffic on a per-carrier basis. More specifically, eNodeB 12 may use a per-carrier scheduling ratio to determine how many resource blocks of a component carrier are assigned to a UE 17 of standard user for each resource block that is assigned to a UE 16 of a standard user. For example, an LTE network may set the per-carrier scheduling ratio in a given coverage area to 2:1. Configured as such, eNodeB will assign two resource blocks to a traffic flow to the UE 17 of standard user, for each resource block that is assigned to a traffic flow to the UE 16 of a heavy user. Other examples are also possible.

In a further aspect of an exemplary embodiment, the LTE network 10 may define a target aggregate scheduling ratio between heavy users and standard users. In particular, the target aggregate scheduling ratio may specify how many units of data (e.g., resource blocks) should be transmitted to a standard user across all carriers in a coverage area, for each unit of data that is transmitted to a heavy user across all carriers in the same coverage area. For example, in order to promote fairness of resource allocation amongst users, an LTE network may define a target aggregate scheduling ratio of 2:1, which indicates that an eNodeB should transmit two units of data to and/or from the UE 17 of a standard user for every one unit of data that is transmitted to the UE 16 of a heavy user.

When a heavy user's UE and a standard user's UE have the same or similar carrier-aggregation capabilities, setting the per-carrier scheduling ratio in a given coverage area equal to the target aggregate scheduling ratio may achieve the target aggregate scheduling ratio.

For example, consider the scenario where UE 16 is associated with the user-account of a heavy user (e.g., is assigned to QCI 8), UE 17 is associated with the user-account of a standard user (e.g., is assigned to QCI 9), and the target aggregate scheduling ratio between heavy users and standard users is set at 2:1. In this scenario, if UE 16 and UE 17 are both configured for carrier aggregation, then the eNodeB 12 may utilize the same number of component carriers for traffic flows to UE 16 as it utilizes for traffic flows to UE 17. Therefore, if eNodeB 12 sets the per-carrier scheduling ratio equal to the target aggregate scheduling ratio of 2:1, the eNodeB may assign UE 17 two resource blocks on each component carrier to UE 17, for resource block assigned to UE 16 on each component carrier. Thus, in this scenario, setting the per-carrier scheduling ratio for a given coverage area equal to the target aggregate scheduling ratio may achieve the target aggregate scheduling ratio for the component carriers in the coverage area. For instance, if eNodeB transmits to both UE 17 and UE 16 on each of two component carriers, and implements a 2:1 scheduling ratio for each component carrier, then eNodeB 12 will transmit to UE 17 an aggregate of four units of data via the two component carriers, for every two units of data that is transmitted to UE 16 via the two component carriers, which is the equivalent of a 2:1 aggregate scheduling ratio.

On the other hand, when a heavy user's UE is configured for carrier aggregation and a standard user's UE is not configured for carrier aggregation, an exemplary eNodeB may responsively adjust the per-carrier scheduling ratio for a given coverage area in an effort to achieve the target aggregate scheduling ratio across all component carriers in the coverage area.

For example, consider again the scenario where UE 16 is associated with the user-account of a heavy user (e.g., is assigned to QCI 8), UE 17 is associated with the user-account of a standard user (e.g., is assigned to QCI 9), and the target aggregate scheduling ratio between heavy users and standard users is set at 2:1. In this scenario, if the heavy user's UE 16 is configured for carrier aggregation and the standard user's UE 17 is not configured for carrier aggregation, then the eNodeB may dynamically update the per-carrier scheduling ratio in order to achieve or maintain the target aggregate scheduling ratio between heavy users and standard users.

Figure 2:
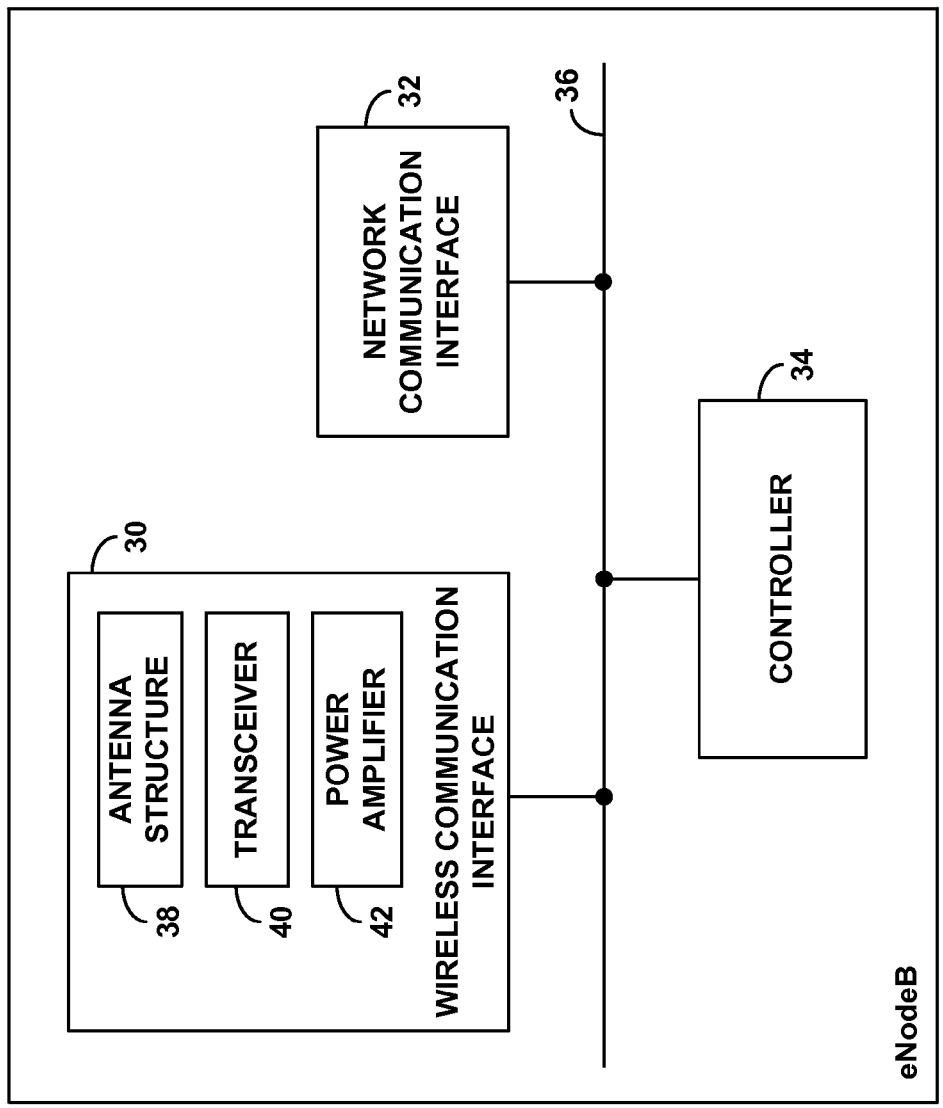
FIG. 2 is a simplified block diagram of a base station, according to an exemplary embodiment.

FIG. 2 is next a simplified block diagram of an example eNodeB (e.g., macro base station, small cell, or other eNodeB), showing some of the components that could be included in such an entity to facilitate carrying out various base station functions described herein. As shown, the example eNodeB includes a wireless communication interface 30, a network communication interface 32, and a controller 34, all of which could be integrated together in various ways or, as shown, interconnected with each other through a system bus, network, or other connection mechanism 36.

Wireless communication interface 32 includes an antenna structure (e.g., one or more antennas or antenna elements) 38, which could be tower mounted or provided in some other manner, configured to transmit and receive over the air interface and thereby facilitate communication with served UEs. Further, the wireless communication interface includes a transceiver 40 and power amplifier 42 supporting air interface communication according to the LTE protocol. Network communication interface 34 may then comprise one or more wired and/or wireless network interfaces (such as an Ethernet interface) through which the base station may receive data over a backhaul connection that connects the base station to one or more entities of a wireless network, such as an MME and SGW as discussed above.

Controller 34, which may be integrated with wireless communication interface 32 or with one or more other components of the eNodeB, may then manage communication over the air interface, including managing assignment of component carriers in accordance with the present disclosure. As such, controller 34 may include a scheduler, such as a MAC scheduler. Alternatively, a scheduler may be implemented as a separate component of the eNodeB, which coordinates with controller 34 to implement a scheduling policy according to an exemplary embodiment.

By way of example, controller 34 may be configured to determine the relative carrier-aggregation capabilities between a two or more classes of user equipment (UE) in a coverage area served by the eNodeB, and to dynamically adjust a per-carrier scheduling ratio for the given coverage area based on the relative carrier-aggregation capabilities between the two or more UE classes. Further, controller 34 may be configured to determine a usage level in the given coverage area, and implement the aforementioned functionality in response to a determination that the usage level in the given coverage area is greater than a threshold usage level.

Controller 34 could be implemented using hardware, software, and/or firmware. For example, controller 34 could include one or more processors and a non-transitory computer readable medium (e.g., volatile and/or non-volatile memory) that stores machine language instructions or other executable instructions. The instructions, when executed by the one or more processors, may cause controller 34, and thus the eNodeB, to carry out the various base station operations described herein.

Figure 3:
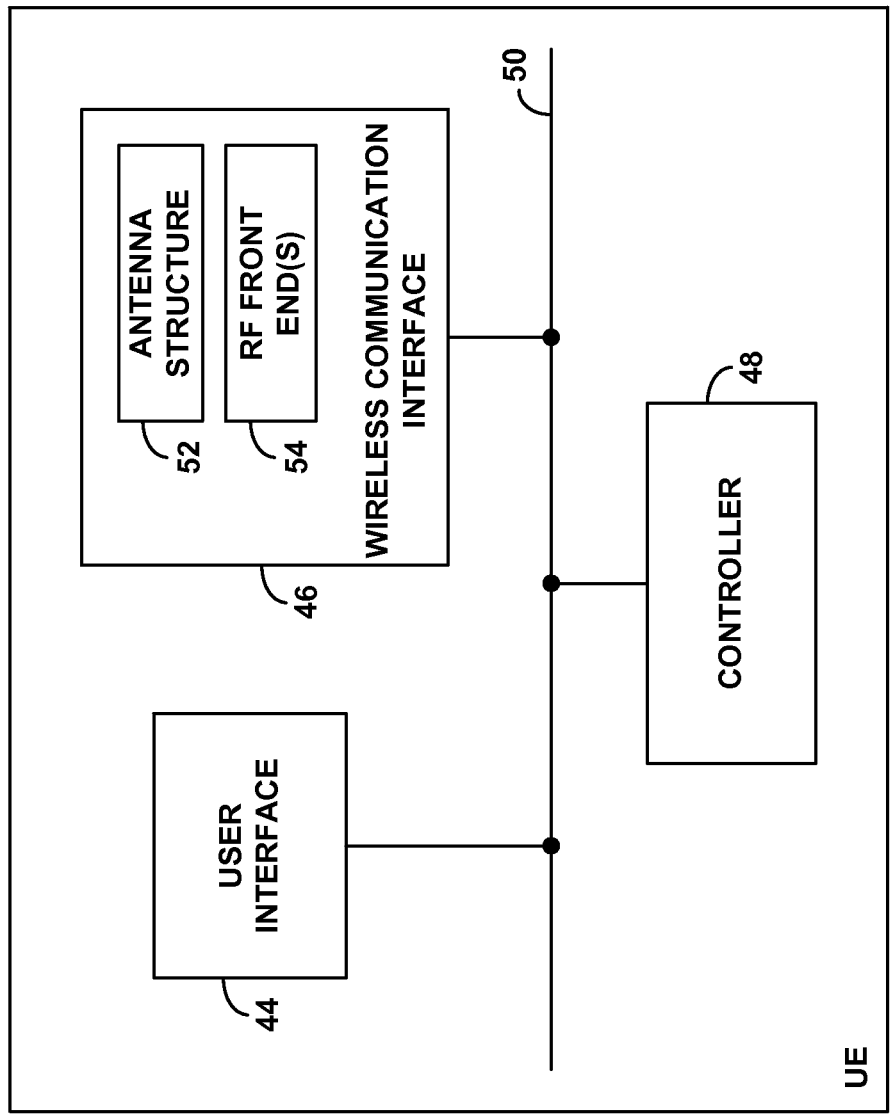
FIG. 3 is a simplified block diagram of user equipment, according to an exemplary embodiment.

FIG. 3 is next a simplified block diagram of an example UE such as UE 16 or UE 17, showing some of the components that may be included in such a device to facilitate carrying out various UE functions described herein. As shown, the example UE includes a user interface 44, a wireless communication interface 46, and a controller 48, all of which could be integrated together in various ways or, as shown, interconnected with each other through a system bus, network, or other connection mechanism 50.

User interface 44 may include input and output components to facilitate interaction with a user, if the UE is a user-operable device. Wireless communication interface 46 includes an antenna structure (e.g., one or more antennas or antenna elements) 52, configured to transmit and receive over the air interface and thereby facilitate communication with a serving eNodeB. Further, the wireless communication interface includes one or more radio frequency (RF) front ends 54 for interfacing between the antenna structure and one or more radios (not shown) or other components, so as to support air interface communication on various carriers. Controller 48, which may be integrated with wireless communication interface 46 or with one or more other components, may then control various UE functions.

The one or more RF front ends 54 of the UE may comprise active components configured to support bi-directional communication via the antenna structure 52 concurrently on multiple component carriers on which the UE is being served with carrier-aggregation service.

Figure 4:
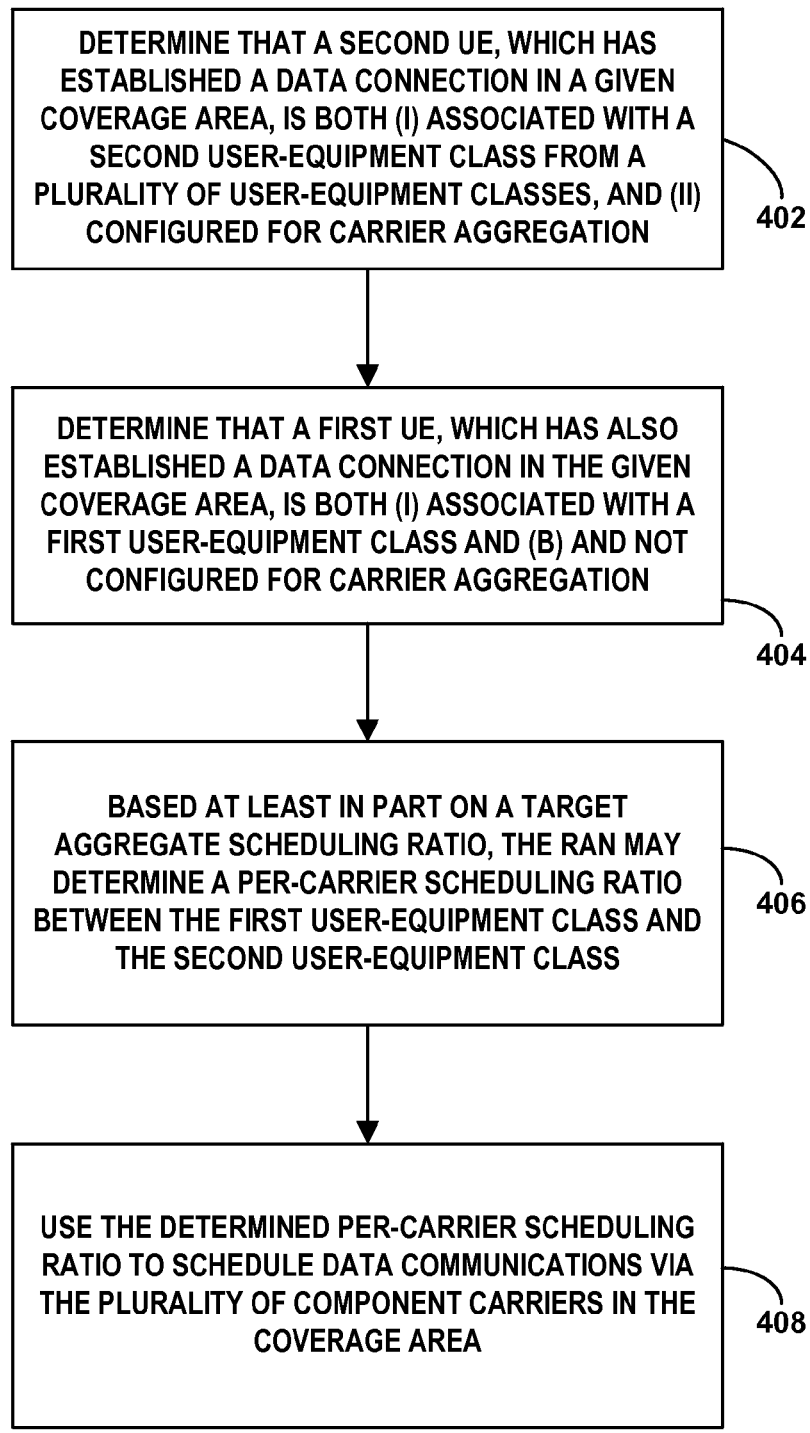
FIG. 4 is flow chart illustrating a method, according to an exemplary embodiment.

FIG. 4 is flow chart illustrating a method 400, according to an exemplary embodiment. Method 400 is described by way of example as being carried out by a radio access network (RAN). It should be understood that functions described as being carried out by a RAN may be carried out by one or more components of an access network (e.g., an LTE network). For instance, method 400 or portions thereof may be implemented by a network component, such as an eNodeB, in an effort to more fairly allocate network resources amongst users. Of course, it should be understood that method 400 or portions thereof may be implemented by other entities or combinations of entities, and/or may be implemented for other purposes, without departing from the scope of the invention.

As shown by block 402, method 400 involves a RAN determining that a second UE, which has established a data connection in a given coverage area, is both (i) associated with a second user-equipment class from a plurality of user-equipment classes, and (ii) configured for carrier-aggregation service. Further, at block 404, the RAN determines that a first UE, which has also established a data connection in the given coverage area, is both (i) associated with the first user-equipment class and (b) and not configured for carrier-aggregation service.

At least in part in response to the determination that both the first UE and the second UE have established respective data connections in the same coverage area, the RAN may implement blocks 406 and 408 to dynamically determine a per-carrier scheduling ratio in an accordance with a scheduling policy that aims to achieve fairness between heavy users and normal users. In particular. Specifically, based at least in part on a target aggregate scheduling ratio, the RAN may determine a per-carrier scheduling ratio between the first user-equipment class (e.g., QCI 9, assigned to normal users) and the second user-equipment class (e.g., QCI 8, assigned to heavy users), as shown by block 406. The RAN may then use the determined per-carrier scheduling ratio to schedule data communications via the plurality of component carriers in the coverage area, as shown by block 408.

In some embodiments, an eNodeB that utilizes method 400 may initially set a first per-carrier scheduling ratio, which is equal to the target aggregate scheduling ratio. For instance, consider a scenario where (a) all UEs of the first user-equipment class, which have established data connections a given coverage area, are configured for carrier aggregation, and (b) all UEs of the second user-equipment class, which have established data connections the given coverage area, are also configured for carrier aggregation. In this scenario, the eNodeB may initially use a first per-carrier scheduling ratio that is equal to the target aggregate scheduling ratio.

More specifically, since both UEs of the first and second UE classes are configured for carrier-aggregation service, the increase in data rate that is provided to a heavy user's UE by carrier-aggregation service may likewise be experienced by a normal user's UE. And, because both UEs are provided with carrier-aggregation service in this scenario, the actual aggregate scheduling ratio, across all carrier components used for carrier aggregation service, will generally be the same as the per-carrier scheduling ratio. Therefore, in this scenario the per-carrier scheduling ratio may simply be set equal to the target aggregate scheduling ratio. (Note that the above reasoning may apply equally when (a) none of the UEs of the first user-equipment class, which have established data connections a given coverage area, are configured for carrier aggregation, and (b) none of UEs of the second user-equipment class, which have established data connections the given coverage area, are configured for carrier aggregation.)

Referring again to method 400, in an exemplary implementation, the first user-equipment class may correspond to first user accounts having a standard data-usage level, and the second user-equipment class may correspond to second user accounts having a heavy data-usage level. In an exemplary embodiment, the first user-equipment class may include UEs that are associated with user accounts having normal data usage levels, and which therefore are assigned to QCI 9, while the second user-equipment class may include UEs that are associated with user accounts having high data usage levels, and which therefore are assigned to QCI 8. As such, blocks 402 and 404 may collectively be implemented by an eNodeB to determine that a heavy user's UE that is capable of carrier aggregation, while a standard user's UE that is not capable of carrier aggregation, are both located in the same coverage area. Blocks 406 and 408 may then be carried out by the eNodeB to responsively update the per-carrier scheduling ratio in an effort to achieve or maintain a target aggregate scheduling ratio between the first user-equipment class and the second user-equipment class, across all carriers in the coverage area.

In the scenario where at least one heavy user's UE is configured for carrier aggregation, while at least one normal user's UE in the same coverage area is not configured for carrier aggregation, setting a per-carrier scheduling ratio equal to the target aggregate scheduling ratio will no longer achieve an actual aggregate scheduling ratio that is equal to the target aggregate scheduling ratio. Accordingly, at block 406, the eNodeB may responsively determine a per-carrier scheduling ratio in effort to achieve the target aggregate scheduling ratio in the coverage area. In some embodiments, an eNodeB may use the number of component carriers in the given coverage area as a basis for determining the second per-carrier scheduling ratio.

For example, consider the scenario where there are N component carriers that can be utilized for carrier-aggregation service in the given coverage area, and where the per-carrier scheduling ratio. Further, recall that the target aggregate scheduling ratio may specify an aggregate number of resource blocks, across all carriers in a coverage area, which should be designated for the first UE (e.g., the UE having a normal usage level), for each resource block that is designated for the second UE (e.g., the UE having a heavy usage level). In this scenario, the eNodeB may determine a per-carrier number of resource blocks to designate for the first UE by: (i) multiplying the aggregate number of resource blocks that should be designated for the first UE, by the number of component carriers in the given coverage area, and (ii) setting the second per-carrier scheduling ratio to designate the determined per-carrier number of resource blocks for the first user-equipment class, for each resource block that is designated for the second user-equipment class.

In a further aspect of some embodiments, an eNodeB may dynamically switch between use of different per-carrier scheduling ratios in a coverage area, based on the attributes of the UEs that are engaged in communications in the coverage area. For example, as explained above, an eNodeB may using a first per-carrier scheduling ratio that is equal to the aggregate scheduling ratio when both (a) UEs of the first user-equipment class are not configured for carrier aggregation and (b) UEs of the second user-equipment class are not configured for carrier aggregation. Subsequently, if the eNodeB detects a disparity in the coverage area between the carrier-aggregation capabilities of at least one heavy user's UE and at least one normal user's UE, such that the target aggregate scheduling ratio may not be achieved using the first per-carrier scheduling ratio, the eNodeB may update its scheduling policy. In particular, the eNodeB may switch from use of the first per-carrier scheduling ratio to use of a second per-carrier scheduling ratio, which may be determined in accordance with a method such as method 400.

Figure 5:
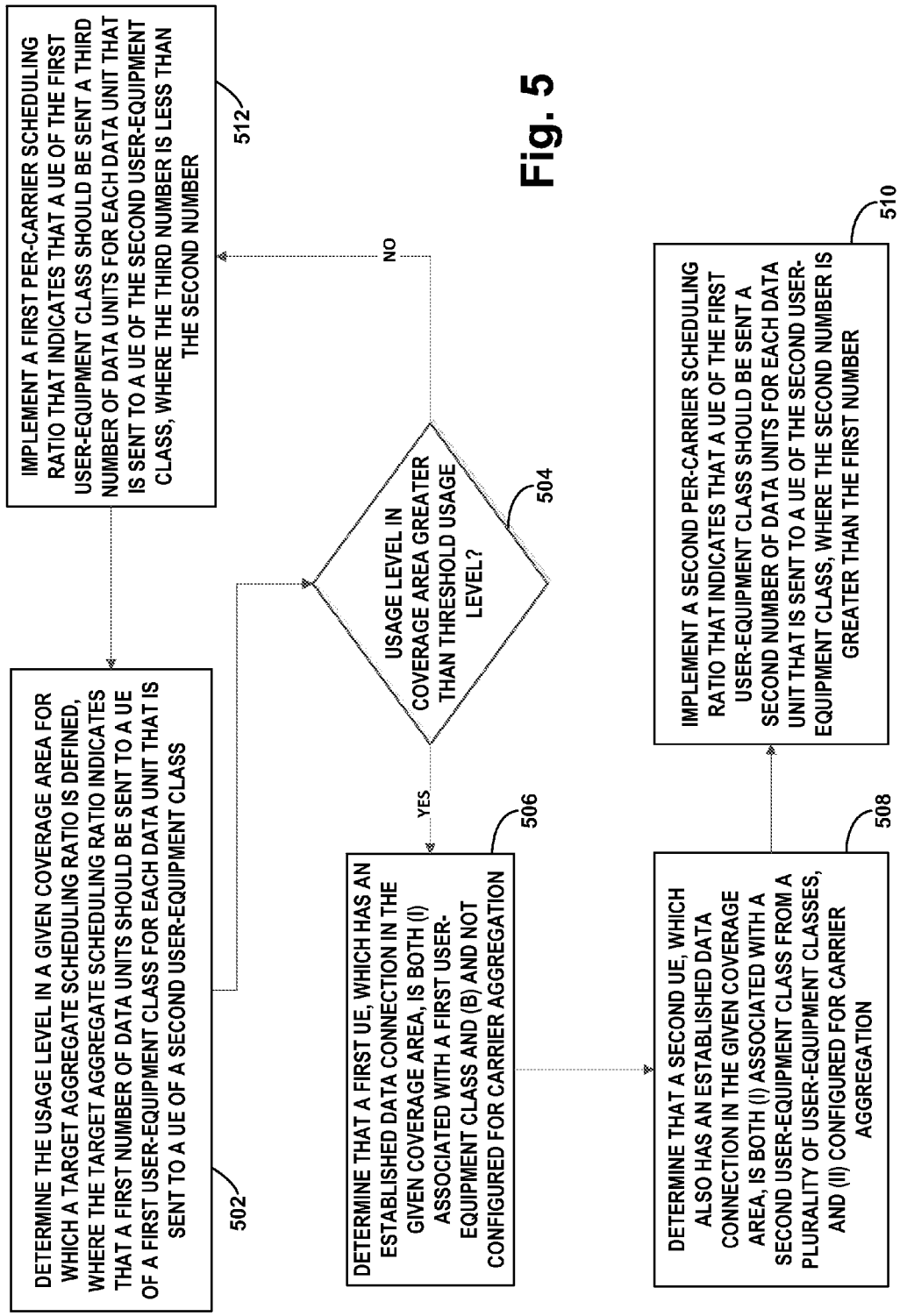
FIG. 5 is a flow chart illustrating a method in which dynamic adjustment of the per-carrier scheduling ratio is enabled in a coverage area based on a usage level in the coverage area, according to an exemplary embodiment.

In a further aspect of some embodiments, a RAN (e.g., an eNodeB) may enable and/or disable a process for dynamically adjusting the per-carrier scheduling ratio in a coverage area, based on a usage level of the coverage area's resources. For example, in some embodiments, a method for dynamically adjusting the per-carrier scheduling ratio may only be implemented in a given coverage area when the load (e.g., traffic level) in the given coverage area is high (e.g., greater than a threshold usage level). For example, FIG. 5 is a flow chart illustrating a method 500 in which dynamic adjustment of the per-carrier scheduling ratio is enabled in a coverage area based on a usage level in the coverage area, according to an exemplary embodiment.

More specifically, at block 502 of method 500, a RAN may continuously, periodically, or from time to time, determine the usage level in a given coverage area for which a target aggregate scheduling ratio is defined. In an exemplary embodiment, this target aggregate scheduling ratio indicates that a first number of data units that should be sent to a UE of a first user-equipment class for each data unit that is sent to a UE of a second user-equipment class.

Further, at block 502, the usage level in a given coverage area may be determined in various ways. For example, an eNodeB and/or MME may determine a percentage of the physical resource block (PRB) that has been in use over some predetermined period of time. Additionally or alternatively, an eNodeB and/or MME may determine a percentage of available bandwidth (e.g., in KBs) that has been in use over some predetermined period of time. Other techniques for determining the usage level in a coverage area are also possible.

At block 504, the RAN determines whether or not the usage level in the given coverage area is greater than a threshold usage level. If the usage level in the given coverage area is greater than a threshold usage level, the RAN may responsively implement a process to dynamically adjust the per-carrier scheduling ratio in the given coverage area according to the relative carrier-aggregation capabilities of different classes of UEs in the coverage, such as the process described in reference to blocks 506 to 510 of method 500.

Specifically, at block 506, the RAN determines that a first UE, which has established a data connection in the given coverage area, is both (i) associated with a first user-equipment class from the plurality of user-equipment classes, and (ii) not configured for carrier-aggregation service. Additionally, at block 508, the RAN determines that a second UE, which has a concurrently established data connection in the given coverage area, is both (i) associated with a second user-equipment class, and (ii) configured for carrier-aggregation service.

Then, in response to the determining that both the first UE and the second UE have established respective data connections in the given coverage area (such that at least one component carrier is shared by the second UE and the first UE), the RAN may implement a per-carrier scheduling ratio that indicates that a UE of the first user-equipment class should be sent a second number of data units for each data unit that is sent to a UE of the second user-equipment class, where the second number is greater than the first number, as shown by block 510. In an exemplary embodiment, the second number of data units is equal to the first number of data units multiplied by the number of component carriers in the coverage area.

Further, in some embodiments, when the usage level in the coverage area is below the threshold level, the RAN may implement a first per-carrier scheduling ratio that indicates that a UE of the first user-equipment class should be sent a third number of data units for each data unit that is sent to a UE of the second user-equipment class, where the third number is less than the second number, as shown by block 512. For example, the third number may be set equal to the first number, such that the first per-carrier scheduling ratio is equal to the target aggregate scheduling ratio. Other examples are also possible. In such embodiments, the per-carrier scheduling ratio that is implemented at block 510 may be a second per-carrier scheduling ratio, which is selected in an effort to enforce a fairness policy between the first and second UE classes (e.g., between heavy and normal data users). As such, method 500 may be implemented to dynamically switch between two or more per-carrier scheduling ratio based on a combination of the relative carrier-aggregation capabilities between a two or more classes of user equipment (UE) in the coverage and the usage level in the given coverage area.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   determining, by a radio access network (RAN) that is configured for carrier-aggregation service via a plurality of component carriers in a given coverage area, that a second user equipment (UE) is both (i) associated with a second user-equipment class from a plurality of user-equipment classes, and (ii) configured for carrier-aggregation service, wherein the second UE has established a data connection in the given coverage area;
   determining, by the RAN, that a first UE that has also established a data connection in the given coverage area, is both (i) associated with a first user-equipment class from the plurality of user-equipment classes, and (ii) not configured for carrier-aggregation service;
   at least in part in response to the determination that both the first UE and the second UE have established respective data connections in the given coverage area, the RAN:
   (a) determining, based at least in part on a target aggregate scheduling ratio across all the component carriers for the given coverage area, a per-carrier scheduling ratio between the first user-equipment class and the second user-equipment class; and
   (b) using the determined per-carrier scheduling ratio to schedule data communications via the plurality of component carriers.

2. The method of claim 1, further comprising:
   initially determining a usage level in the given coverage area; and
   in response to determining that the usage level in the given coverage area is greater than a threshold usage level, carrying out the method of claim 1.

3. The method of claim 1, wherein the first user-equipment class corresponds to first user accounts having a standard data-usage level, and wherein the second user-equipment class corresponds to second user accounts having a heavy data-usage level.

4. The method of claim 3, wherein a given user account is assigned to the first user-equipment class if data usage associated with the given user account is below a threshold level, and wherein the given user account is assigned to the second user-equipment class if data usage associated with the given user account is above a threshold level.

5. The method of claim 3, wherein the first user-equipment class comprises UEs that are assigned quality-of-service class identifier (QCI) 9, and wherein the second user-equipment class comprises UEs that are assigned QCI 8.

6. The method of claim 1, wherein, initially, the first UE has not yet established the data connection in the coverage area, the method further comprising:
   initially using a first per-carrier scheduling ratio to schedule data communications via the plurality of component carriers in the coverage area;
   wherein the determined per-carrier scheduling ratio is a second per-carrier scheduling ratio between the first user-equipment class and the second user-equipment class; and
   wherein, in order to use the determined per-carrier scheduling ratio to schedule data communications via the plurality of component carriers, the RAN switches from using the first per-carrier scheduling ratio to using the second per-carrier scheduling ratio to schedule data communications via the plurality of component carriers in the given coverage area.

7. The method of claim 6:
wherein using the first per-carrier scheduling ratio to schedule data communications via the plurality of component carriers results in an aggregate scheduling ratio across all of the component carriers that is equal to the target aggregate scheduling ratio when both (a) all UEs of the first user-equipment class, which are engaged in communications in the coverage, are not configured for carrier aggregation and (b) all UEs of the first user-equipment class, which are engaged in communications in the coverage, are not configured for carrier aggregation; and
wherein using the second per-carrier scheduling ratio to schedule data communications via the plurality of component carriers results in an aggregate scheduling ratio across all of the component carriers that is equal to the target aggregate scheduling ratio when both (a) at least one UE of the first user-equipment class is not configured for carrier aggregation and (b) at least one UE of the second user-equipment class is configured for carrier aggregation.

8. The method of claim 7, wherein the first per-carrier scheduling ratio is equal to the target aggregate scheduling ratio, and wherein the second per-carrier scheduling ratio multiplies the number of resource blocks that should be assigned to the first user-equipment class, for each resource block that is assigned to the second user-equipment class, by the number of component carriers in the coverage area.

9. The method of claim 1, wherein determining the per-carrier scheduling ratio comprises:
using a number of component carriers available for carrier aggregation in the given coverage area as a basis for determining the second per-carrier scheduling ratio.

10. The method of claim 9, wherein a number of component carriers are available for carrier aggregation in the given coverage area, wherein the target aggregate scheduling ratio specifies an aggregate number of resource blocks that should be designated for the first UE in the given coverage area, for each resource block that is designated for the second UE in the given coverage area, and wherein determining the per-carrier scheduling ratio comprises:
determining a per-carrier number of resource blocks to designate to the first UE by multiplying the aggregate number of resource blocks that should be designated for the first UE by the number of component carriers in the given coverage area; and
setting the second per-carrier scheduling ratio to designate the determined per-carrier number of resource blocks to first UE on a given component carrier, for each resource block that is designated to the second UE on the given component carrier.

11. A method comprising:
determining, by a radio access network (RAN) that is configured for carrier-aggregation service via a plurality of component carriers in a given coverage area, a usage level in the given coverage area, wherein a target aggregate scheduling ratio is defined for the coverage area, and wherein the target aggregate scheduling ratio indicates that a first number of data units that should be sent to a user equipment (UE) of a first user-equipment class for each data unit that is sent to a UE of a second user-equipment class; and
determining, by the RAN, that the usage level in the given coverage area is greater than a threshold usage level and responsively:
(a) determining, by the RAN, that a first UE that has established a data connection in the given coverage area is both (i) associated with a first user-equipment class from the plurality of user-equipment classes, and (ii) not configured for carrier-aggregation service;
(b) determining that a second UE that has established a data connection in the given coverage area is both (i) associated with a second user-equipment class, and (ii) configured for carrier-aggregation service; and
(c) in response to the determining that both the first UE and the second UE have established respective data connections in the given coverage area, implementing a per-carrier scheduling ratio that indicates that a UE of the first user-equipment class should be sent a second number of data units for each data unit that is sent to a UE of the second user-equipment class, wherein the second number is greater than the first number.

12. The method of claim 11, wherein the per-carrier scheduling ratio is a second per-carrier scheduling ratio, the method further comprising:
initially using a first per-carrier scheduling ratio to schedule data communications via the plurality of component carriers in the coverage area; and
in response to the determining that both the first UE and the second UE have established respective data connections in the given coverage area, switching from using of the first per-carrier scheduling ratio to using the second per-carrier scheduling ratio to schedule data communications on the plurality of component carriers in the given coverage area.

13. The method of claim 11, wherein the second number of data units is equal to the first number of data units multiplied by the number of component carriers in the coverage area.

14. A method comprising:
determining, by a radio access network (RAN) that is configured for carrier-aggregation service via a plurality of component carriers in a given coverage area, a usage level in the given coverage area; and
determining, by the RAN, that the usage level in the given coverage area is greater than a threshold usage level and responsively:
determining relative carrier-aggregation capabilities between two or more classes of user equipment (UE) that have established data connections in the coverage area;
determining that the relative carrier-aggregation capabilities in the coverage indicate at least one UE of a first user-equipment class that is not configured for carrier-aggregation service, and at least one UE of a second user-equipment class is configured for carrier-aggregation service;
responsively adjusting a per-carrier scheduling ratio for the given coverage area based on the relative carrier-aggregation capabilities between the two or more UE classes; and
scheduling communications for transmission over the plurality of component carriers, via the at least one wireless communication interface, in accordance with the adjusted per-carrier scheduling ratio.

15. The method of claim 14, wherein determining the relative carrier-aggregation capabilities between the two or more UE classes comprises:
(a) determining that a first UE that has established a data connection in the given coverage area is both (i) associated with a first user-equipment class from the plurality of user-equipment classes, and (ii) not configured for carrier-aggregation service; and
(b) determining that a second UE that has established a data connection in the given coverage area is both (i) associated with a second user-equipment class, and (ii) configured for carrier-aggregation service.

16. The system of claim 15, wherein adjusting the per-carrier scheduling ratio for the given coverage area based on the relative carrier-aggregation capabilities between the two or more UE classes that have established data connections in the coverage area comprises:
in response to the determining that both the first UE and the second UE have established respective data connections in the given coverage area, implementing a per-carrier scheduling ratio that indicates that a UE of the first user-equipment class should be sent a second number of data units for each data unit that is sent to a UE of the second user-equipment class, wherein the second number is greater than the first number.

17. A system comprising:
at least one wireless communication interface operable to provide carrier-aggregation service via a plurality of component carriers in a given coverage area of a radio access network; and
a controller configured to determine that a usage level in the given coverage area is greater than a threshold usage level and responsively perform functions comprising:
determining relative carrier-aggregation capabilities between two or more classes of user equipment (UE) that have established data connections in the coverage area; and
determining that the relative carrier-aggregation capabilities in the coverage indicate at least one UE of a first user-equipment class that is not configured for carrier-aggregation service, and at least one UE of a second user-equipment class is configured for carrier-aggregation service, and responsively:
(a) adjusting a per-carrier scheduling ratio for the given coverage area based on the relative carrier-aggregation capabilities between the two or more UE classes that have established data connections in the coverage area; and
(b) scheduling communications for transmission over the plurality of component carriers, via the at least one wireless communication interface, in accordance with the adjusted per-carrier scheduling ratio.

18. The system of claim 17, wherein the function of determining the relative carrier-aggregation capabilities between the two or more UE classes comprises:
(a) determining that a first UE that has established a data connection in the given coverage area is both (i) associated with a first user-equipment class from the plurality of user-equipment classes, and (ii) not configured for carrier-aggregation service; and
(b) determining that a second UE that has established a data connection in the given coverage area is both (i) associated with a second user-equipment class, and (ii) configured for carrier-aggregation service.

19. The system of claim 18, wherein the function of adjusting the per-carrier scheduling ratio for the given coverage area based on the relative carrier-aggregation capabilities between the two or more UE classes that have established data connections in the coverage area comprises:
in response to the determining that both the first UE and the second UE have established respective data connections in the given coverage area, implementing a per-carrier scheduling ratio that indicates that a UE of the first user-equipment class should be sent a second number of data units for each data unit that is sent to a UE of the second user-equipment class, wherein the second number is greater than the first number.

20. The system of claim 18, wherein a given user account is assigned to the first user-equipment class if data usage associated with the given user account is below a threshold level, and wherein the given user account is assigned to the second user-equipment class if data usage associated with the given user account is above a threshold level.

* * * * *